(12) United States Patent
Kegel et al.

(10) Patent No.: US 9,606,936 B2
(45) Date of Patent: Mar. 28, 2017

(54) GENERALIZED CONTROL REGISTERS

(75) Inventors: Andy Kegel, Redmond, WA (US);
Mark Hummel, Franklin, MA (US);
Tony Asaro, Toronto (CA); Philip Ng,
Toronto (CA)

(73) Assignees: Advanced Micro Devices, Inc.,
Sunnyvale, CA (US); ATI Technologies ULC, Markham, Ontario (CA)

( * ) Notice: Subject to any disclaimer, the term of this patent is extended or adjusted under 35 U.S.C. 154(b) by 812 days.

(21) Appl. No.: 13/309,748

(22) Filed: Dec. 2, 2011

(65) Prior Publication Data

US 2012/0159039 A1 Jun. 21, 2012

Related U.S. Application Data

(60) Provisional application No. 61/423,828, filed on Dec. 16, 2010.

(51) Int. Cl.
| | |
|---|---|
| *G06F 12/10* | (2016.01) |
| *G06F 12/1081* | (2016.01) |
| *G06F 12/1009* | (2016.01) |
| *G06F 12/109* | (2016.01) |

(52) U.S. Cl.
CPC ...... *G06F 12/1081* (2013.01); *G06F 12/1009* (2013.01); *G06F 12/109* (2013.01); *G06F 2212/151* (2013.01); *Y02B 60/1225* (2013.01)

(58) Field of Classification Search
CPC ............ G06F 12/1009; G06F 12/1081; G06F 12/109; G06F 2212/151

USPC .............................................. 711/206; 7/206
See application file for complete search history.

(56) References Cited

U.S. PATENT DOCUMENTS

| | | | | |
|---|---|---|---|---|
| 7,363,463 | B2 * | 4/2008 | Sheu et al. | 711/203 |
| 7,426,627 | B2 * | 9/2008 | Wooten | 711/207 |
| 7,653,803 | B2 * | 1/2010 | Hummel et al. | 711/207 |
| 8,095,771 | B2 * | 1/2012 | Sheu et al. | 711/203 |
| 2005/0097298 | A1 * | 5/2005 | Cohen | 711/206 |
| 2006/0069899 | A1 * | 3/2006 | Schoinas et al. | 711/206 |
| 2006/0206658 | A1 * | 9/2006 | Hendel et al. | 711/6 |
| 2006/0259734 | A1 * | 11/2006 | Sheu et al. | 711/203 |
| 2011/0022818 | A1 * | 1/2011 | Kegel et al. | 711/206 |
| 2011/0023027 | A1 * | 1/2011 | Kegel et al. | 718/1 |
| 2011/0082962 | A1 * | 4/2011 | Horovitz et al. | 711/6 |

* cited by examiner

*Primary Examiner* — David X Yi
*Assistant Examiner* — Ramon A Mercado
(74) *Attorney, Agent, or Firm* — Volpe and Koenig, P.C.

(57) ABSTRACT

Methods, systems, and computer readable media generalize control registers in the context of memory address translations for I/O devices. A method includes maintaining a table including a plurality of concurrently available control register base pointers each associated with a corresponding input/output (I/O) device, associating each control register base pointer with a first translation from a guest virtual address (GVA) to a guest physical address (GPA) and a second translation from the GPA to a system physical address (SPA), and operating the first and second translations concurrently for the plurality of I/O devices.

26 Claims, 10 Drawing Sheets

Device Table is indexed by DeviceID.
Guest CR3 L1 Table is indexed by PASID[8:0].
Guest page tables are indexed by GVA.
DTE GCR3 Table Root Pointer is an SPA.
GCR3 Base Pointers and guest page table entries are GPA.

Device Table is indexed by DeviceID.
Guest CR3 Level 2 Table and GCR3 Level-1 Table are indexed using PASID.
Guest page tables are indexed by GVA.
DTE GCR3 Table Root Pointer is an SPA.
GCR3 Base Table Pointer, GCR3 Base Pointer, and guest page table entries are GPA.
Guest CR3 Level-2 table is indexed by PASID[17:9]
Guest CR3 Level-1 table is indexed by PASID[8:0]

GENERALIZED CONTROL REGISTERS

CROSS REFERENCE TO RELATED APPLICATIONS

This application claims priority under 35 U.S.C. 119(e) to Provisional Application No. 61/423,828, filed Dec. 16, 2010, which is incorporated by reference herein in its entirety.

BACKGROUND OF THE INVENTION

Field of the Invention

The present invention is generally directed to computing systems. More particularly, the present invention is directed to computer registers in the context of memory address translations.

Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) efficient scheduling, (ii) providing quality of service (QoS) guarantees between processes, (iii) programming model, (iv) compiling to multiple target instruction set architectures (ISAs), and (v) separate memory systems—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

In another example, the GPU, along with other peripherals (e.g., input/output (I/O) devices) may need to access information stored in memory of a computer system. For enhanced performance, the computer system can provide virtual memory capabilities for the I/O device. Accordingly, multiple I/O devices may request information based on corresponding virtual addresses, and the computer system translates the virtual addresses to a physical addresses corresponding to memory. An input/output memory management unit (IOMMU) may provide address translation services between the multiple I/O devices and memory.

The computing system can also provide multiple virtualized systems, including virtualized guest operating systems (OSes) managed by a hypervisor. In order to provide access to the I/O devices, the computer system can virtualize I/O devices for each guest OS. That is, the hypervisor manipulates memory by coordinating conversions from virtual memory addresses to physical memory addresses for each of the I/O devices for each of the virtualized guest OSes. This process is performed so that each virtualized system can access the I/O devices as though each guest OS was the only OS accessing the I/O devices.

Thus, the hypervisor can become a bottleneck as it executes software routines to accommodate all of the requests for address translations. Since each of these translations is associated with accessing the IOMMU, the software based operation of the hypervisor represents significant overhead. This overhead can degrade performance. Additional overhead is associated with organizing and manipulating memory structures in memory for efficient and concurrent access to memory translations to accommodate multiple I/O devices.

SUMMARY OF EMBODIMENTS OF THE INVENTION

What is needed, therefore, is the ability to provide concurrently accessible address translation for multiple I/O devices and guest OSes that enhances performance and reduces overhead.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

More specifically, embodiments of the present invention relate to methods, systems, and computer readable media for generalized control registers (such as, for example, control register 3 (CR3)—in x86 microprocessors which is used by an x86 microprocessor processor to translate physical addresses from virtual addresses by locating both the page directory and page tables for a current task) in the context of memory address translations for I/O devices. An exemplary method includes maintaining a table including a concurrently available control register, e.g., guest control register 3 (GCR3), base pointers each associated with a corresponding input/output (I/O) device. Each control register base pointer is associated with a first translation from a guest virtual address (GVA) to a guest physical address (GPA), and a second translation from the GPA to a system physical address (SPA). The first and second translations are operated concurrently for the I/O devices.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

DETAILED DESCRIPTION OF EMBODIMENTS OF THE INVENTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the team "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
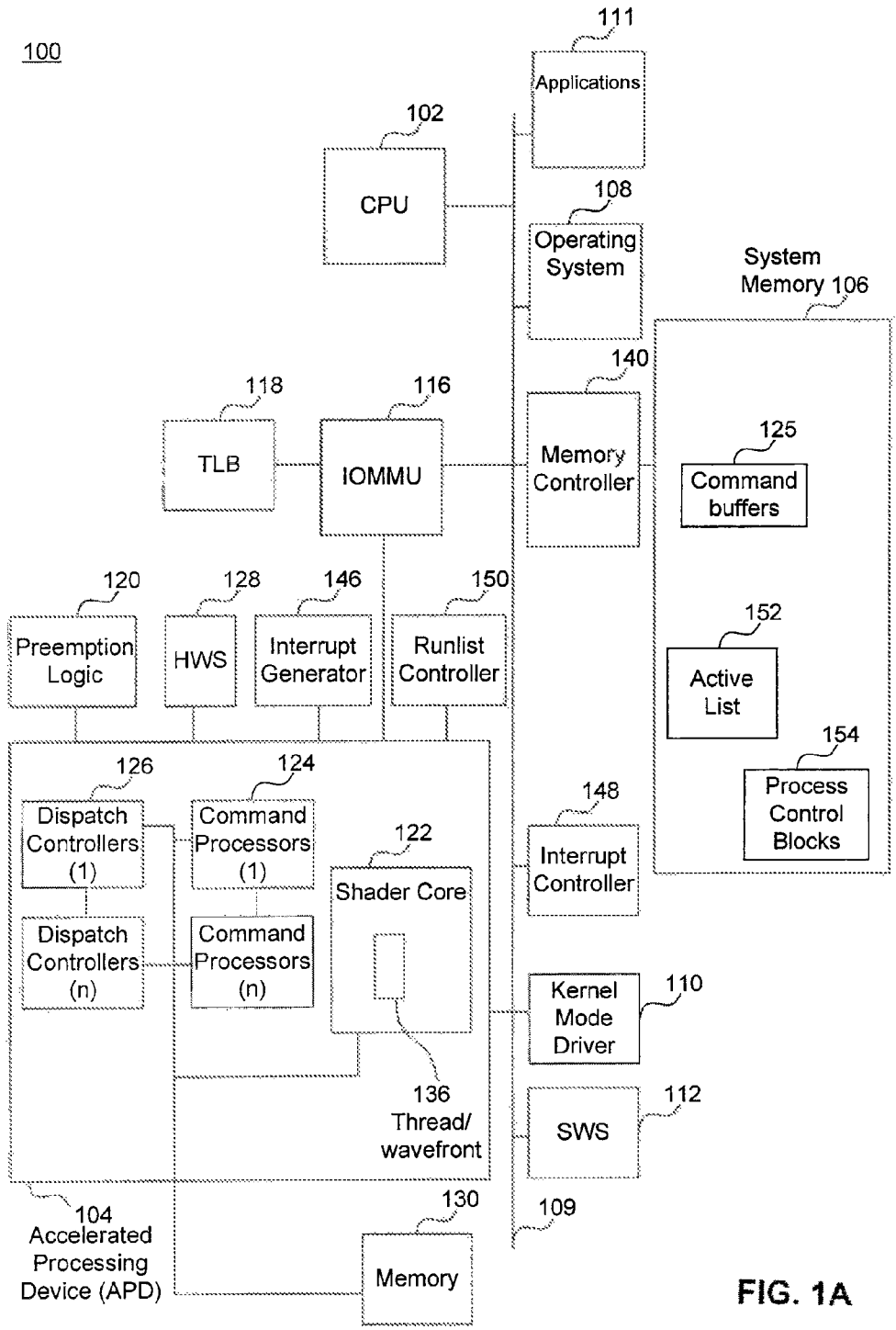
FIG. 1A is an illustrative block diagram of a processing system in accordance with embodiments of the present invention.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing, and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term, state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set.

Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104. In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/cm in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
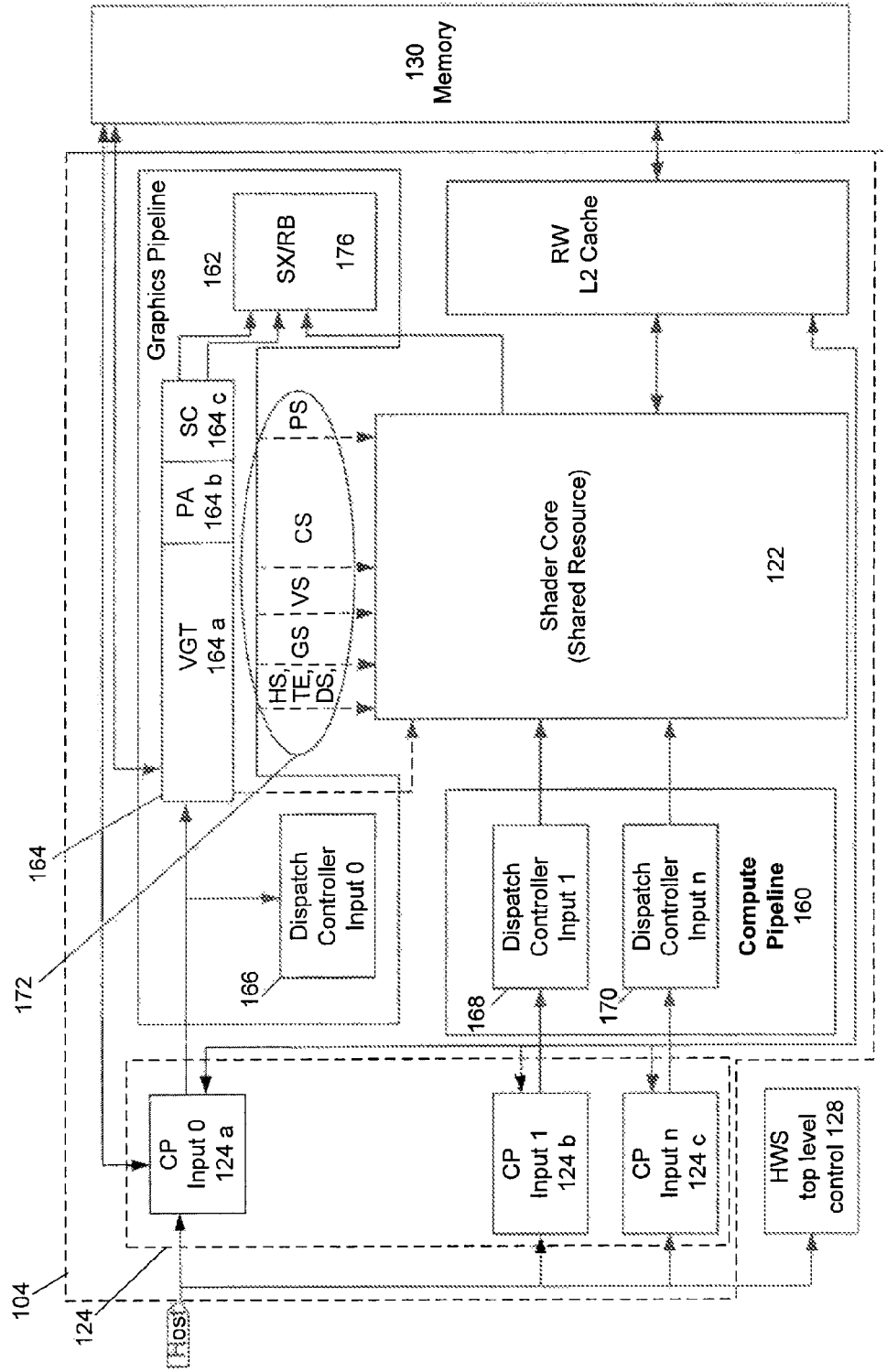
FIG. 1B is an illustrative block diagram illustration of the accelerated processing device illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

Figure 2:
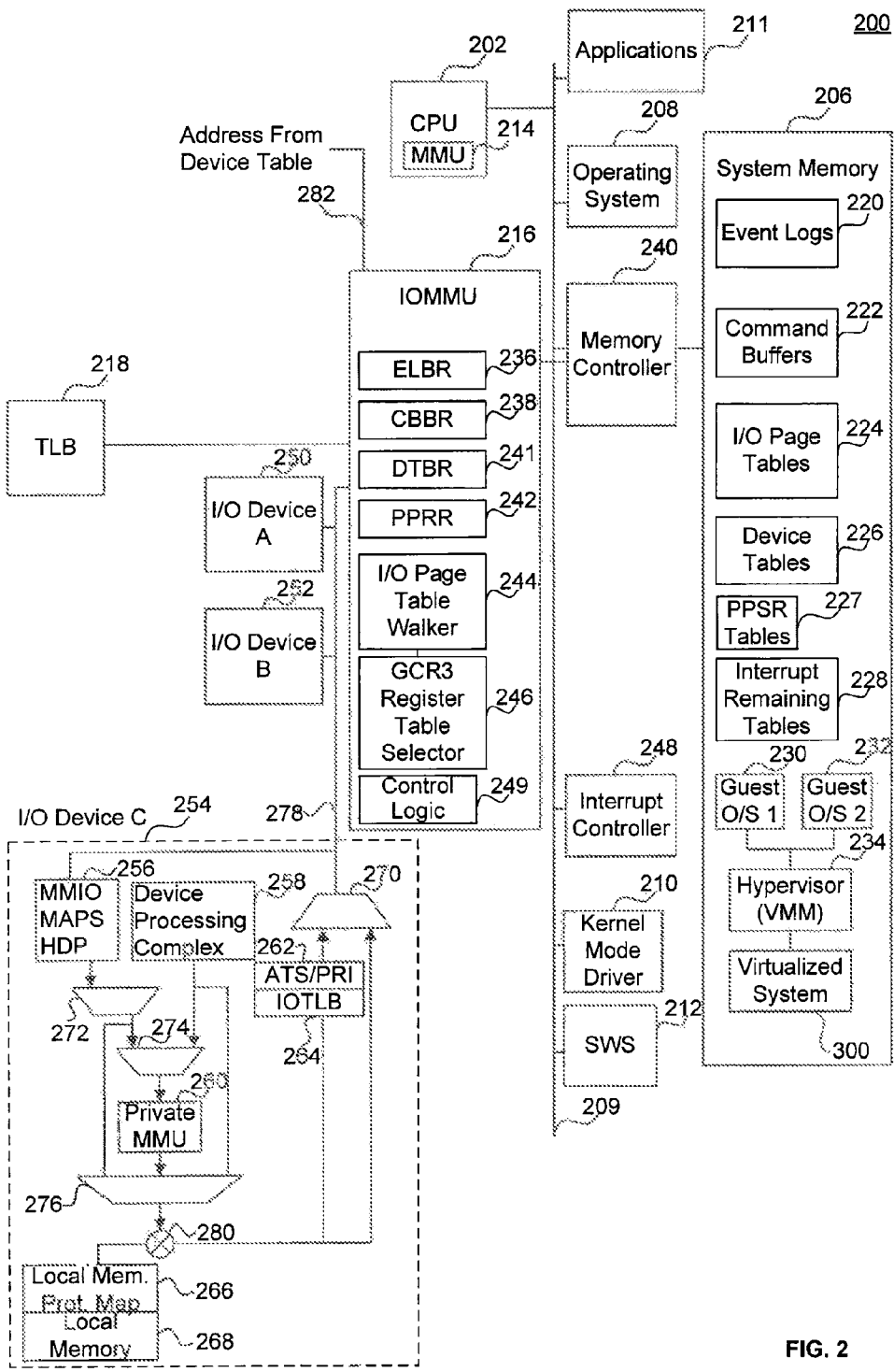
FIG. 2 is an illustrative block diagram of IOMMU architecture and memory management for the CPU and I/O devices, and memory mapping structure, in accordance with embodiments of the present invention.

FIG. 2 is an illustrative block diagram of a computing system 200, which is an alternative embodiment of the computing system 100 of FIG. 1A. The computing system 200 includes IOMMU architecture and memory management for a CPU and I/O devices, along with a system memory mapping structure in accordance with embodiments of the present invention. However, details of many of the components of computing system 100, discussed above, also apply to similar components within computing system 200. Therefore, details of these similar components will not be repeated in the discussion of computing system 200.

A memory mapping structure can be configured to operate between memory 206, memory controller 240, IOMMU 216, and I/O devices A, B, and C, represented by numerals 250, 252, and 254, respectively, connected via a bus 278. IOMMU 216 can be a hardware device that operates to translate direct memory access (DMA) virtual addresses into system physical addresses. IOMMU 216 can construct one or more unique address spaces and use the unique address space(s) to control how a device's DMA operation accesses memory. FIG. 2 only shows one IOMMU for the sake of example. Embodiments of the present invention, however, can include more than one IOMMU.

Generally, an IOMMU can be connected to its own respective bus and I/O device(s). In FIG. 2, a bus 209 can be any type of bus used in computer systems, including a PCI bus, an AGP bus, a PCIe bus (which is more accurately described as a point to point protocol), or any other type of bus whether presently available or developed in the future. Bus 209 may further interconnect interrupt controller 248, kernel mode driver 210, SWS 212, applications 211, and operating system 208 with other components in system 200.

The I/O device C can include memory management I/O (MMIO) maps and host data path (HDP) 256, device processing complex 258, private memory management unit (MMU) 260, and input output translation lookaside buffer (IOTLB) 264. The I/O device C can also include address translation service (ATS)/page request interface (PRI) request block 262, local memory 268, local memory protection map 266, and multiplexers 270, 272, 274, 276, and 280.

Embodiments of IOMMU 216 can be set up to include device table base register (DTBR) 241, command buffer base register (CBBR) 238, event log base register (ELBR) 236, control logic 249, and peripheral page request register (PPRR) 242. Further, IOMMU 216 can include guest control register table selector 246 to invoke I/O page table walker 244 to traverse the page tables, e.g., for address translations. Also, the IOMMU 216 can be associated with one or more TLBs 218 for caching address translations that are used for fulfilling subsequent translations without needing to perform a page table walk. Addresses from a device table can be communicated to IOMMU via bus 282.

Embodiments of the present invention provide for the IOMMU 216 to use I/O page tables 224 to provide permission checking and address translation on memory accessed by I/O devices. Also, embodiments of the present invention, as an example, can use I/O page tables designed in the AMD64 long format. The device tables 226 allow I/O devices to be assigned to specific domains. The I/O page tables also may be configured to include pointers to the I/O devices' page tables.

Memory 206 also includes interrupt remapping table (IRT) 228, command buffers 222, event logs 220, and a virtualized system 300 (discussed in greater detail below). Memory 206 also includes a host translation module, such as hypervisor 234. Memory 206 also includes one or more concurrently running guest operating systems such as, but not limited to, guest operating system 1, represented by element number 230, and guest operating system 2, represented by element number 232.

Further, IOMMU 216 and the memory 206 can be set up such that DTBR 241 points to the starting index of device tables 226. Further, CBBR 238 points to the starting index of command buffers 222. The ELBR 236 points to the starting index of event logs 220. PPRR 242 points to the starting index of PPSR tables 227.

IOMMU 216 can use memory-based queues for exchanging command and status information between the IOMMU 216 and the system processor(s), such as CPU 202. CPU 202 can include MMU 214.

In accordance with one illustrative embodiment, IOMMU 216 can intercept requests arriving from downstream devices (which can be communicated using, for example, HyperTransport™ link or a PCI based bus), perform permission checks and address translation for the requests, and send translated versions upstream to memory 206 space. Other requests may be passed through unaltered.

I/O devices A, B, and C, represented by numerals 250, 252, and 254, respectively, can request address translations from the IOMMU 216 such that the IOMMU 216 receives multiple address translation requests concurrently. System overhead may be associated with a need for software manipulation and maintenance (e.g., using hypervisor 234 and/or guest O/Ses 230 and 232) of address table pointers and associated software construct support.

Accordingly, the IOMMU 216 can minimize overhead by efficiently providing concurrent hardware-based address translation services for multiple I/O devices. IOMMU 216 can service multiple I/O devices by providing concurrently accessible address translation services for each I/O device. Thus, each I/O device is not required to serially share a single control register to access GVA-to-GPA address translations.

The acronym GVA can refer to a virtual address, e.g., a guest virtual address. The acronym GPA can refer to a first type of physical address, e.g., a guest physical address for a virtual system. However, a GPA can be viewed as a type of virtual address relative to the underlying system hosting the virtualized system/guest OS. Thus, GPA can refer to a system virtual address (SVA), which is a virtual address for the underlying system hosting the virtual system. The acronym SPA can refer to a second type physical address, e.g., a system physical address.

Figure 3:
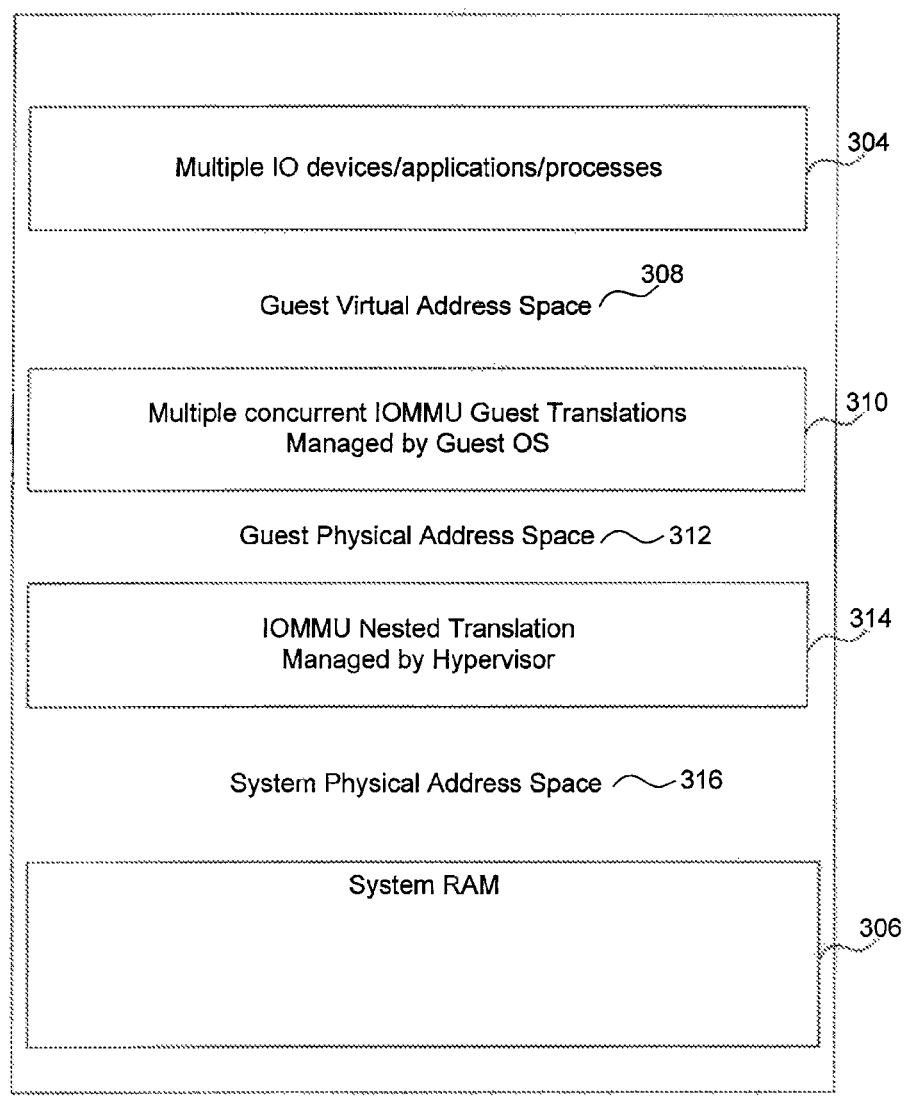
FIG. 3 is an illustrative block diagram of a virtualized system, in accordance with embodiments of the present invention.

FIG. 3 is a more detailed block diagram illustration of virtualized system 300, shown in FIG. 2, in accordance with embodiments of the present invention. System 300 includes multiple I/O devices/applications/processes (I/O devices 304) and random access memory (RAM) 306.

By way of example, I/O devices 304 can include graphics processing device(s). The I/O devices 304 interact with the memory 306 in the virtualized system 300 via a table of generalized control register pointers enabled by an IOMMU.

In the virtualized system 300, GVAs for address translation are provided to the IOMMU 216 by the I/O devices 304 using address translation transactions. Thus, the GVAs are associated with a guest virtual address space 308. The IOMMU provides a first layer of translation, multiple concurrent IOMMU guest translations 310, to convert the GVAs to GPAs associated with guest physical address space 312. The multiple concurrent IOMMU guest translations 310 may be managed by a guest OS operating in the virtualized system 300.

The IOMMU 216 also provides a second layer of translation, IOMMU nested translation 314, to convert the GPAs to SPAs associated with system physical address space 316. The IOMMU nested translation 314 can be managed by a hypervisor operating in the virtualized system 300. The SPAs can be used to access information in the memory 306.

Accordingly, the IOMMU provides concurrent virtual address translation for multiple I/O devices 304. The IOMMU provides a hardware solution with improved performance for concurrent address translations, including translations involving peripherals and virtualized guest OSes. Hardware can automatically load entries to/from the page tables using a table of generalized guest control register pointers. This loading occurs without needing software intervention that would otherwise be needed to manage access to a single control register in the absence of multiple concurrently accessible generalized guest control register pointers provided by the present embodiments. Virtualized systems involving address translations among multiple guest O/Ses and multiple I/O devices can benefit greatly from the speed associated with a hardware-based implementation of generalized control register pointers. This hardware-based implementation facilitates concurrent access to address translation information for multiple O/Ses and/or I/O devices.

Figure 4:
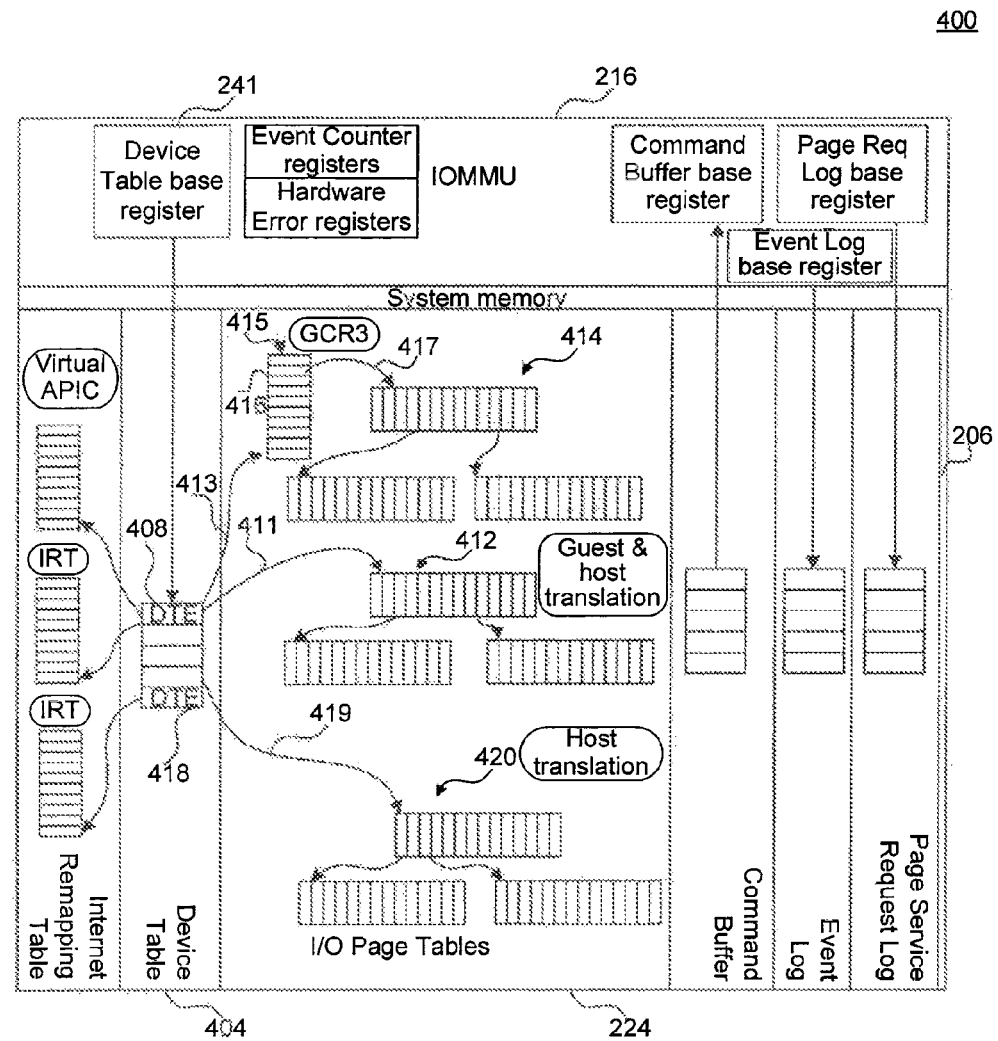
FIG. 4 is an illustrative block diagram of data structures associated with an IOMMU and memory, in accordance with embodiments of the present invention.

FIG. 4 is an illustrative block diagram 400 of data structures associated with IOMMU 216 and memory 206 in accordance with embodiments of the present invention. As noted above, IOMMU 216 includes various registers, including device table base register 241. Device table base register 241 includes a pointer to the root of device table 404, located within device tables 226 of FIG. 2. Device table 404 includes device table entries (DTEs) 408. Each DTE 408 includes pointers to the root of the data structures for I/O page tables 224 in memory 206.

DTE 408 may include a system pointer 411 pointing to a root of a system address translation table structure 412, and a guest pointer 413 pointing to a root of guest control register table 415. Guest control register table 415 includes a plurality of guest control register table entries 416. Each guest control register table entry 416 includes a guest control register base pointer 417 that points to a corresponding guest address translation table structure 414. FIG. 4 illustrates one guest address translation table structure 414, although a plurality of guest address translation table structures 414 can be used, corresponding to the plurality of guest control register table entries 416. Accordingly, the IOMMU 216 can concurrently access a plurality of system/guest address translation table structures 412 and 414, including concurrently available guest control register table entries 416 corresponding to multiple I/O devices, for address translation.

Thus, any number of control registers, e.g., guest CR3 "registers" (pointers/table entries 416) can be implemented using the guest control register table 415. An embodiment can include more than 64,000 guest control register table entries 416 for example, all active concurrently without needing to deactivate any of them or switch contexts/threads/hyperthreads. The IOMMU 216 can select from any of the guest control register table entries 416 at any point in time without incurring software overhead (e.g., hypervisor intervention).

For performing GVA-to-GPA translations, the IOMMU 216 may access the guest address translation table structures 414 using guest pointer 413 to obtain a GPA. A GPA address may concurrently be used to perform GPA-to-SPA translations by accessing the system address translation table structures 412 using system pointer 411. The IOMMU 216 may perform multiple address translations concurrently and/or independently, for multiple I/O devices and/or guest O/Ses. IOMMU 216 may also perform single-layer translation using DTE 418 including a system pointer 419 pointing to a root of a system address translation table structure 420.

Figure 5:
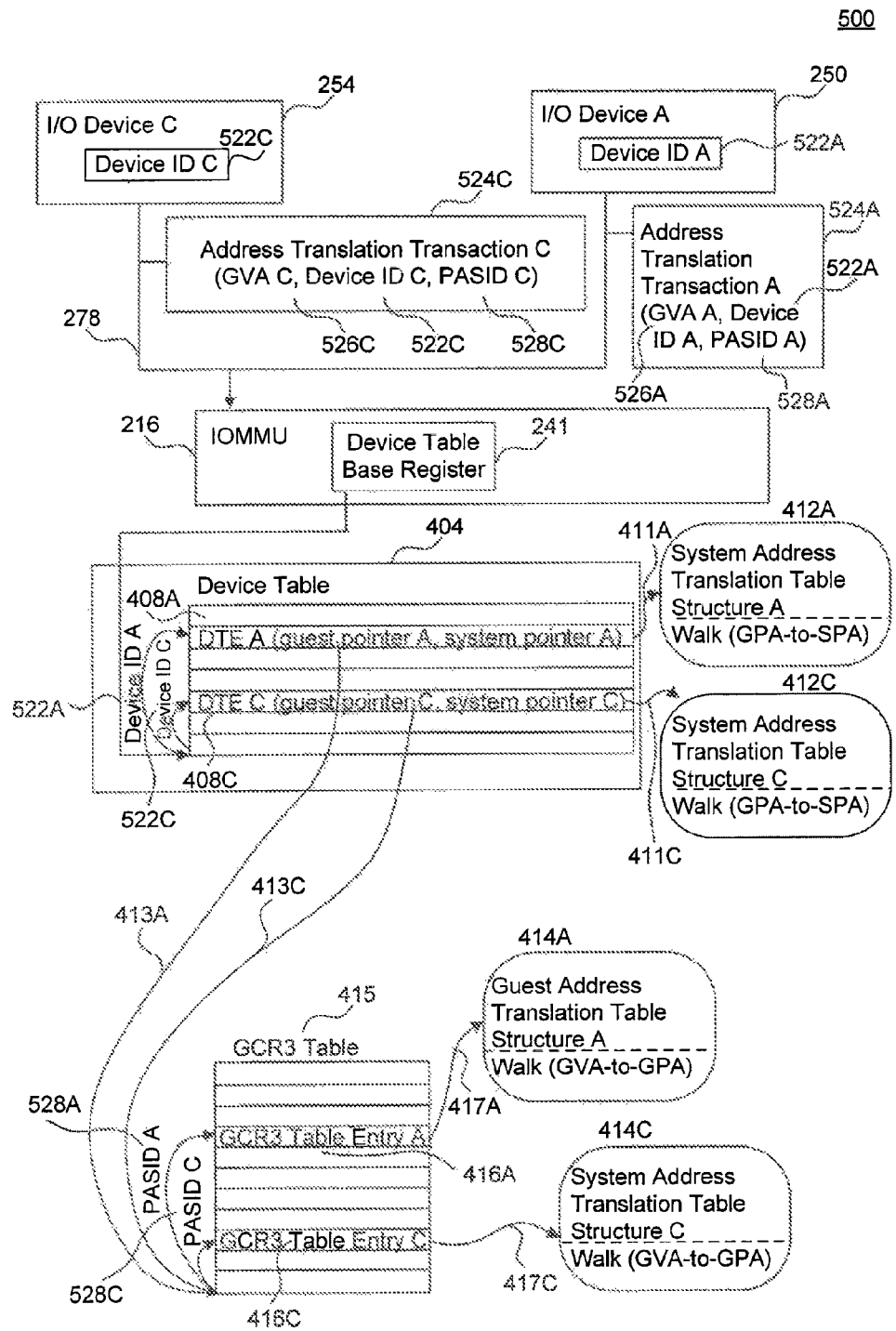
FIG. 5 is an illustrative block diagram of data structures associated with concurrent address translation and generalized control register pointers, in accordance with embodiments of the present invention.

FIG. 5 is an illustrative block diagram 500 of data structures associated with concurrent address translation and generalized control register pointers in accordance with the illustrative embodiment of FIG. 2. I/O device C 254 (see FIG. 2) is associated with a device identifier C 522C. I/O device A 250 (see FIG. 2) is associated with a device identifier A 522A. Device identifiers 522A and 522C may be used to identify different I/O devices, such as a graphics processing device and a network interface controller (NIC).

Additionally, device identifiers 522A and 522C may be used to identify one physical device (e.g., the graphics processing device), with hardware virtualized for different guest O/Ses such that each virtualized device has a corresponding unique device identifier. The device identifiers therefore can be used to identify to which guest O/S a virtualized I/O device is assigned. Device identifiers 522A and 522C may be a bus, device, function DF) designation used in PCIe interfaces.

The I/O device C 254 issues an address translation transaction C 524C (e.g., a request from the I/O device C 254 using ATS according to the PCI-SIG specification) via bus 278. The address translation transaction C 524C may include a GVA C 526C that the I/O device C 254 needs to have translated. The address translation transaction C 524C can also include the device identifier C 522C and a process address space identifier C 528C. The process address space identifier C 528C may be used to identify an application address space within a guest virtual machine (VM), and may be used on I/O device C 254 to isolate concurrent contexts residing in shared local memory. Together, device identifier C 522C and process address space identifier C 528C may uniquely identify an application address space.

I/O device A 250 similarly issues an address translation transaction A 524A including GVA A 526A, device identifier A 522A and process address space identifier A 528A. I/O device C 254 and I/O device A 250 may issue address translation transactions concurrently to the IOMMU 216 for translation.

The address translation transactions 524A and 524C are received by the IOMMU 216. IOMMU 216 accesses device table 404 based on the device table base register 241 containing a root pointer that points to the root of device table 404.

The device table 404 is indexed using device identifiers. Device identifier A 522A from the address translation transaction 524A is used to access DTE A 408A, and device identifier C 522C from the address translation transaction 524C is used to access DTE C 408C. DTE A 408A contains guest pointer A 413A and system pointer A 411A, and DTE C 408C contains guest pointer C 413C and system pointer C 411C (see, e.g., guest pointer 413 and system pointer 411 in FIG. 4). System pointers 411A and 411C are used to walk system address translation table structures 412A and 412C, respectively.

Guest pointers 413A and 413C are used to access the root of guest control register table 415. The guest control register table 415 is indexed using process address space identifiers 528A and 528C from address translation transactions 524A and 524C to access guest control register table entries 416A and 416C, respectively. Guest control register table entries 416A and 416C include guest control register base pointers 417A and 417C pointing to the guest address translation table structures 414A and 414C corresponding to the address translation transactions 524A and 524C, respectively. The guest address translation table structures 414A and 414C are walked using GVA A 526A and GVA C 526C from the address translation transactions 524A and 524C, respectively.

The guest control register table 415 has multiple guest control register table entries including guest control register table entries 416A and 416C. The guest control register table entries are concurrently available to the IOMMU 216, along with concurrently available system address translation table structures 412A and 412C. Thus, the IOMMU 216 can service concurrent address translation transactions 524A and 524C from multiple I/O devices 250 and 254. Guest control register table entries in the guest control register table 415 do not have to be explicitly managed by software (e.g., overwritten/swapped out) when translating addresses for multiple I/O devices. The IOMMU 216 has hardware access to all entries concurrently.

Figure 6:
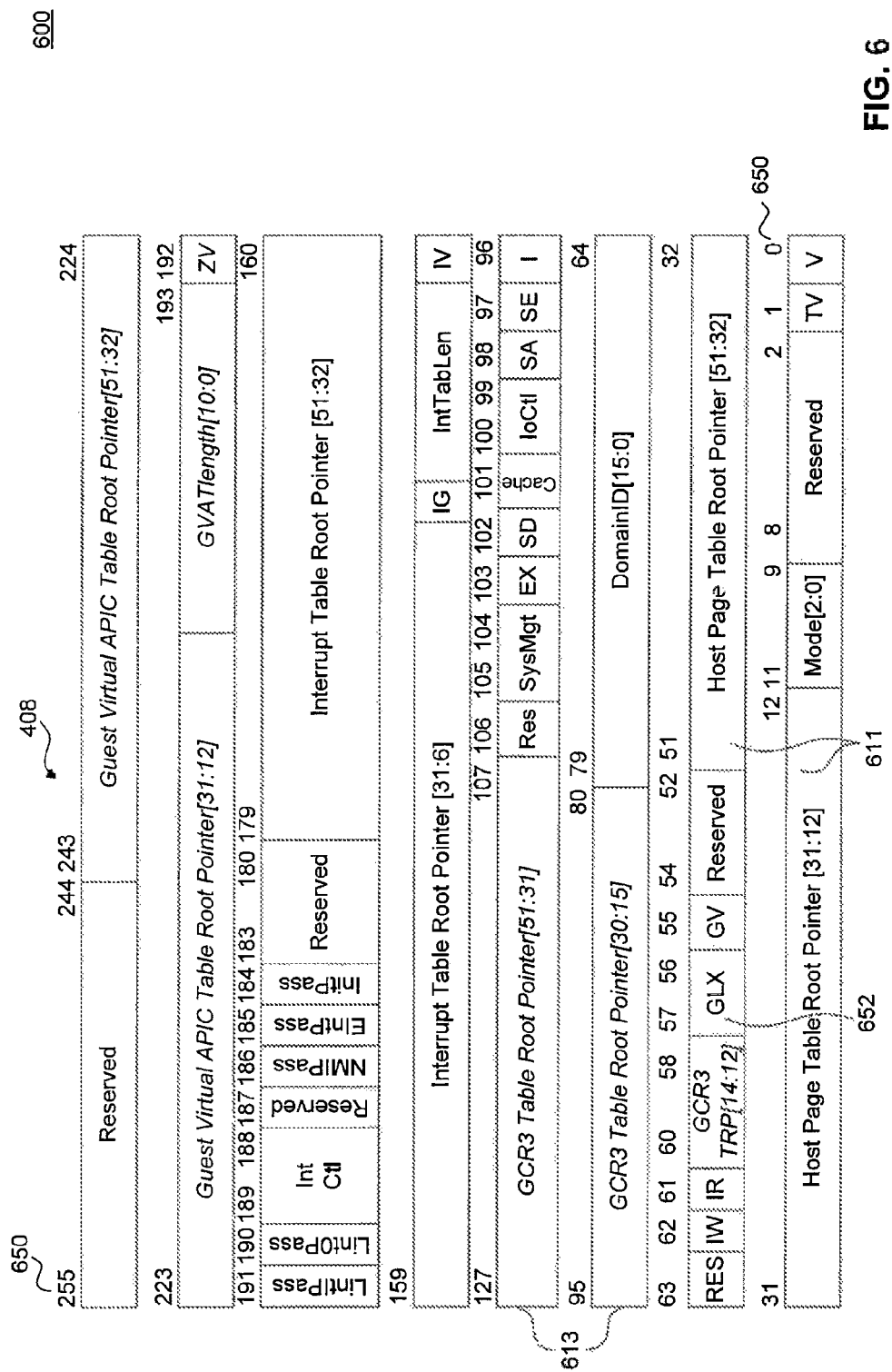
FIG. 6 is an illustrative block diagram of a device table entry, in accordance with embodiments of the present invention.

FIG. 6 is an illustrative block diagram of exemplary device table entry fields and formats 600 in accordance with the illustrative embodiment of FIGS. 4 and 5. Device table entry 408 includes 256 bits (255:0), as indicated by bit labels 650a and 650b, respectively. Bits 51:12 of DTE 408 (host page table root pointer 611) correspond to system pointer 411. Bits 127:107 and 95:80 of DTE 408 (guest control register table root pointer 613) correspond to guest pointer 413. The host page table root pointer 611 is stored in a contiguous section of DTE 408, and guest control register table root pointer 613 is stored in two non-contiguous sections of DTE 408, although other embodiments may be stored in different combinations of contiguous or non-contiguous series of DTE bits.

Guest pointer 413 (guest control register table root pointer 613) may reference guest address translation table structures 414A and 414C (see FIG. 5) having various structures, as indicated by bits 57:56 of DTE 408 (a field to store a value, e.g., GLX 652). GLX 652 may be used to indicate what type of guest address translation table structure is referenced by the DTE 408. GLX 652 specifies the type of guest control register lookup performed by the IOMMU 216 for an I/O device 250, 254 when the I/O device presents an address with a valid process address space identifier. For example, one-, two-, or three-level guest address translation table structures may be used, as identified via GLX 652.

For an I/O device using process address space identifier values up to 9 bits, GLX 652 is used to indicate a one-level guest address translation table structure. For I/O devices using process address space identifier values between 9 bits and 19 bits, GLX 652 is used to indicate a two-level guest address translation table structure. For I/O devices using process address space identifier values of 19 bits or 20 bits, GLX 652 is used to indicate a three-level guest address translation table structure.

Embodiments may use arbitrary levels to represent the guest address translation table structures 414A and 414C, and the form of the structures may be arbitrary. For example, the structure may be instantiated as a table, a hash tree, a long linear list, or a tree of nested lists (e.g., each list being a page 4K in length) that reference each other. Two exemplary guest address translation table structures are described below with reference to FIGS. 7A and 7B.

Figure 7A:
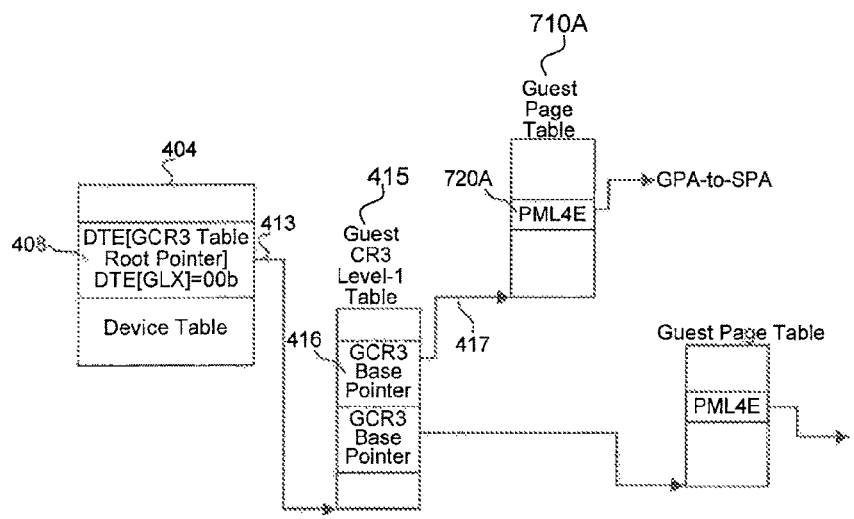
FIG. 7A is an illustrative block diagram of a control register table, in accordance with an embodiment of the present invention.

FIG. 7A is an illustrative block diagram of a one-level guest address translation table structure 700A in accordance with embodiments of the present invention, with reference to the embodiment of FIG. 4. FIG. 7A represents a one-level tree, using guest control register table 415 (see FIG. 4; illustrated in FIG. 7A as guest CR3 Level-1 Table) and guest page table 710A. Device table 404 includes DTE 408 with a guest pointer 413 to a root of guest control register table 415. The guest control register table 415 includes guest control register table entries 416, illustrated in FIG. 7A as GCR3 Base Pointers. Each guest control register table entry 416 includes a guest control register base pointer 417 pointing to a root of a guest page table 710A.

The guest page table 710A includes a plurality of entries, e.g., PML4E 720A. PML4E 720A is a GPA corresponding to the GVA requested to be translated as indicated in the address translation transaction 524 sent to the IOMMU 216. PML4E 720A may be further translated by invoking a GPA-to-SPA translation, e.g., using system address translation table structures 412 (see FIGS. 4 and 5). Thus, the PML4E, corresponding to the GPA resulting from a GVA-to-GPA address translation, is obtained after traversing the one level guest control register table 415.

Figure 7B:
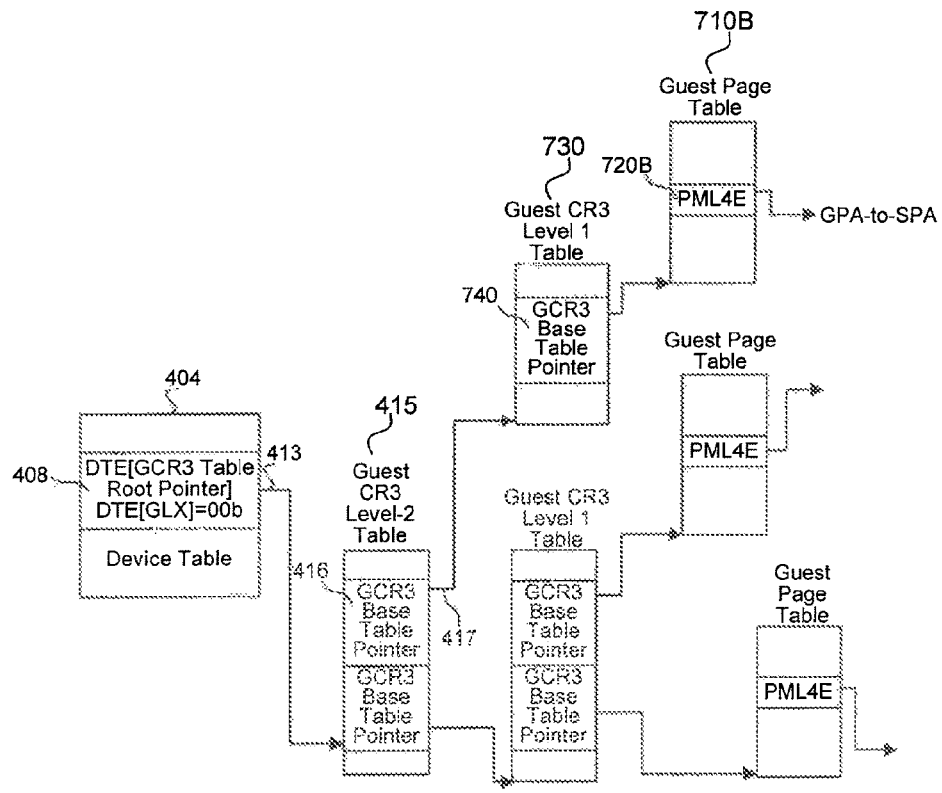
FIG. 7B is an illustrative block diagram of a control register table, in accordance with another embodiment of the present invention.

FIG. 7B is an illustrative block diagram of a two-level guest address translation table structure 700B in accordance with embodiments of the present invention, with reference to the embodiment of FIG. 4. FIG. 7B is similar to FIG. 7A, except the level-1 guest control register table used to index guest page tables 710A is replaced by a level-2 nested tree used to index guest page tables 710B. FIG. 7B represents a two-level tree, using guest control register table 415 (see FIG. 4; illustrated in FIG. 7B as guest CR3 Level-2 Table), guest control register level-1 table 730, and guest page table 710B. Device table 404 includes DTE 408 with a guest pointer 413 to a root of guest control register table 415. The guest control register table 415 includes guest control register table entries 416, illustrated in FIG. 7B as guest control register base table pointers.

Each guest control register table entry 416 includes a guest control register base table pointer 417 pointing to a root of guest control register level-1 table 730. The guest control register level-1 table 730 includes guest control register base pointers 740 pointing to a root of a guest page table 710B. The guest page table 710B, includes a plurality of entries, e.g., PML4E 720B. As in FIG. 7A, each PML4E 720B is a GPA corresponding to the GVA requested to be translated as indicated in the address translation transaction 524 sent to the IOMMU 216. PML4E 720B may be farther translated by invoking a GPA-to-SPA translation, e.g., using system address translation table structures 412 (see FIGS. 4 and 5).

Thus, the PML4E, corresponding to the GPA desired from a GVA-to-GPA address translation, is obtained after traversing two levels, the guest control register table 415 and the guest control register level-1 table 730.

FIGS. 7A and 7B represent two embodiments of a guest address translation table structure 414. However, many additional embodiments are possible, including arbitrary levels of nested depth and/or arbitrary length of tables with arbitrary numbers of entries. As set forth above, a field in the DTE 408 can be used to identify the type of structure used for control registers/guest control register tables associated with that DTE 408.

Figure 8:
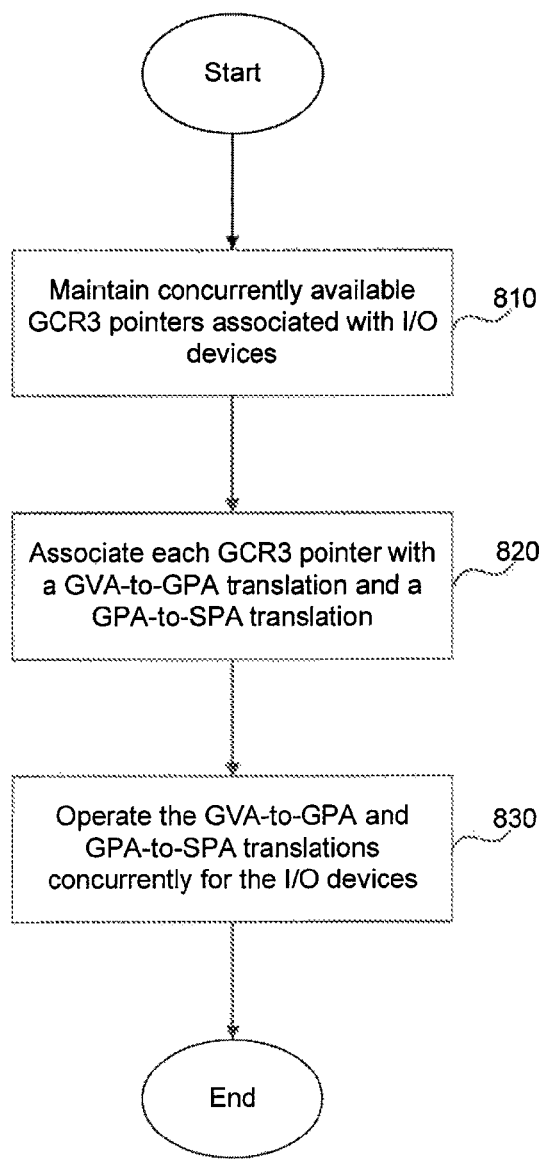
FIG. 8 is an illustrative block diagram of a flowchart illustrating generalized control register addressing, in accordance with embodiments of the present invention.

FIG. 8 is an illustrative block diagram of a flowchart 800 illustrating address translation in the context of concurrently accessible control register entries in accordance with embodiments of the present invention. In step 810, concurrently available guest control register pointers associated with I/O Devices are maintained. The I/O Devices may request address translations associated with the guest control register pointers using address translation transactions that include a transaction layer packet (TLP) prefix, which may have a standardized format for the PCIe bus according to, e.g., the PCI-SIG PASID TLP Prefix ECN specification. An IOMMU may receive the address translation transaction and identify that the process address space identifier is carried in the TLP prefix. The process address space identifier may be used to select a guest control register pointer associated with the I/O device.

In step 820, each guest control register pointer is associated with a GVA-to-GPA translation and a GPA-to-SPA translation. Translation tables of various structures may be used, and may be identified according to a field in the device table entry associated with the guest control register pointer. For example, a two-level nested tree can be used to associate the guest control register pointer to a GVA-to-GPA translation.

In step 830, the GVA-to-GPA and GPA-to-SPA translations are operated concurrently for the I/O devices. Thus, an IOMMU may perform multiple concurrent address translations for multiple I/O devices, including virtualized I/O devices/processes, providing high concurrency for I/O traffic and DMA jobs.

The Summary of Embodiments of the Invention and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
maintaining at least one table, the at least one table including a plurality of concurrently available pointers, each being associated with a corresponding one of a plurality of input/output (I/O) devices;
creating for each pointer a first translation from a virtual address to a first type physical address associated with a first physical address space, and a second translation from the first type physical address to a second type physical address associated with a second physical address space, wherein the second type physical address is different from the first type physical address;
receiving a first translation transaction from a first I/O device from the plurality of I/O devices, wherein the first translation transaction includes a first concurrent context and a first guest virtual address to be translated;
isolating the first concurrent context residing in a shared memory based on the first translation transaction to form a first isolated context;
receiving a second translation transaction from a second I/O device from the plurality of I/O devices, wherein the second translation transaction includes a second concurrent context and a second guest virtual address to be translated;
isolating the second concurrent context residing in the shared memory based on the second translation transaction to form a second isolated context;
performing the first translation, in response to the first translation transaction, of the first guest virtual address to the first physical address based on the at least one table and the first isolated context to generate a first translation result;
performing the first translation of the second guest virtual address to the first physical address based on the table and the second isolated context to generate a second translation result;
performing the second translation of the first translation result and the second translation result to create a respective third translation result and a fourth translation result; and
concurrently performing direct memory access of the second physical address space using the third translation result and the fourth translation result by the first I/O device and the second I/O device.

2. The method of claim 1 wherein the maintaining at least one table includes maintaining a plurality of tables, the plurality of tables singularly or in combination including the plurality of concurrently available pointers.

3. The method of claim 1, further comprising:
identifying a valid process address space identifier in an address translation transaction associated with a first I/O device of the plurality of I/O devices;
wherein the pointers are guest control register table entries and the table is a guest control register table;
accessing a guest pointer based on the valid process address space identifier associated with the first I/O device, wherein the guest pointer is contained in a device table entry and points to a root of the guest control register table;
accessing a guest control register table entry based on the process address space identifier, wherein the guest control register table entry is contained in the guest control register table and points to a root of a guest address translation table structure; and
accessing the guest address translation table structure according to the guest control register table entry.

4. The method of claim 3, wherein the guest address translation table structure includes a plurality of levels.

5. The method of claim 3, wherein:
a first level of the guest address translation table structure is indexed based on a first portion of the process address space identifier, and
a second level of the guest address translation table structure is indexed based on a second portion of the process address space identifier.

6. The method of claim 3, wherein the guest address translation table structure includes a nested tree.

7. The method of claim 3, wherein the guest pointer is the second type physical address associated with the root of the guest control register table.

8. The method of claim 3, wherein the guest control register table entry is the first type physical address associated with the root of the guest address translation table structure.

9. The method of claim 7, wherein the first type physical address of the guest control register table entry is translated to the second type physical address pointing to the root of the guest address translation table structure using a nested first type physical to second type physical address translation.

10. The method of claim 1, wherein the first and second translations are operated in a nested cascade to obtain a virtual address to second type physical address translation.

11. The method of claim 1, wherein the maintaining and providing is managed by a guest operating system.

12. The method of claim 1, further comprising:
exchanging command and status information with a system processor.

13. The method of claim 1, further comprising:
intercepting a translation request from a downstream device.

14. A system, comprising:
a plurality of input/output (I/O) devices; and
an input/output memory management unit (IOMMU), wherein the IOMMU is configured to:
maintain a table including a plurality of concurrently available pointers, each being associated with a corresponding one of the plurality of I/O devices;
create for each pointer a first translation from a virtual address to a first type physical address associated with a first physical address space, and a second translation from the first type physical address to a second type physical address associated with a second physical address space, wherein the second type physical address is different from the first type physical address;
receive a first translation transaction from a first I/O device from the plurality of I/O devices, wherein the first translation transaction includes a first concurrent context and a first guest virtual address to be translated;
isolate the first concurrent context residing in a shared memory based on the first translation transaction to form a first isolated context;
receive a second translation transaction from a second I/O device from the plurality of I/O devices, wherein the second translation transaction includes a second concurrent context and a second guest virtual address to be translated;
isolate the second concurrent context residing in the shared memory based on the second translation transaction to form a second isolated context;
perform the first translation, in response to the first translation transaction, of the first guest virtual address to the first physical address based on the at least one table and the first isolated context to generate a first translation result;
perform the first translation of the second guest virtual address to the first physical address based on the table and the second isolated context to generate a second translation result;
perform the second translation of the first translation result and the second translation result to create a respective third translation result and a fourth translation result; and
concurrently perform direct memory access of the second physical address space using the third translation result and the fourth translation result by the first I/O device and the second I/O device.

15. The system of claim 14, further comprising:
a module configured to identify a valid process address space identifier in an address translation transaction associated with a first I/O device of the plurality of I/O devices;
wherein the pointers are guest control register table entries and the table is a guest control register table;
a module configured to access a guest pointer based on an identifier associated with the first I/O device, wherein the guest pointer is contained in a device table entry and points to a root of the guest control register table;
a module configured to access a guest control register table entry based on the process address space identifier, wherein the guest control register table entry is contained in the guest control register table and points to a root of a guest address translation table structure; and
a module configured to access the guest address translation table structure according to the guest control register table entry.

16. The system of claim 15, wherein the guest address translation table structure includes a plurality of levels.

17. The system of claim 15, wherein:
a first level of the guest address translation table structure is indexed based on a first portion of the process address space identifier, and
a second level of the guest address translation table structure is indexed based on a second portion of the process address space identifier.

18. The system of claim 15, wherein the guest address translation table structure includes a nested tree.

19. The system of claim 15, wherein the guest pointer is the second type physical address associated with the root of the guest control register table.

20. The system of claim 15, wherein the guest control register table entry is the first type physical address associated with the root of the guest address translation table structure.

21. The system of claim 20, wherein the first type physical address of the guest control register table entry is translated to the second type physical address pointing to the root of the guest address translation table structure using a nested first type physical to second type physical address translation.

22. The system of claim 14, wherein the first and second translations are operated in a nested cascade to obtain a virtual address to second type physical address translation.

23. The system of claim 14, wherein the IOMMU is managed by a guest operating system.

24. The system of claim 14, wherein the IOMMU exchanges command and status information with a system processor.

25. The system of claim 14, wherein the IOMMU intercepts a translation request from a downstream device.

26. A non-transitory computer readable medium storing instructions, wherein said instructions when executed cause a method comprising:
maintaining a table including a plurality of concurrently available pointers, each being associated with a corresponding one of a plurality of input/output (I/O) devices;
creating for each pointer a first translation from a virtual address to a first type physical address associated with a first physical address space, and a second translation from the first type physical address to a second type physical address associated with a second physical address space, wherein the second type physical address is different from the first type physical address;
receiving a first translation transaction from a first I/O device from the plurality of I/O devices, wherein the first translation transaction includes a first concurrent context and a first guest virtual address to be translated;
isolating the first concurrent context residing in a shared memory based on the first translation transaction to form a first isolated context;
receiving a second translation transaction from a second I/O device from the plurality of I/O devices, wherein the second translation transaction includes a second concurrent context and a second guest virtual address to be translated;

isolating the second concurrent context residing in the shared memory based on the second translation transaction to form a second isolated context;

performing the first translation, in response to the first translation transaction, of the first guest virtual address to the first physical address based on the at least one table and the first isolated context to generate a first translation result:

performing the first translation of the second guest virtual address to the first physical address based on the table and the second isolated context to generate a second translation result;

performing the second translation of the first translation result and the second translation result to create a respective third translation result and a fourth translation result; and concurrently performing direct memory access of the second physical address space using the third translation result and the fourth translation result by the first I/O device and the second I/O device.

* * * * *